United States Patent
Shi et al.

(10) Patent No.: US 11,310,867 B2
(45) Date of Patent: Apr. 19, 2022

(54) METHOD AND APPARATUS OF CONTROLLING SECONDARY CELL

(71) Applicant: GUANGDONG OPPO MOBILE TELECOMMUNICATIONS CORP., LTD., Guangdong (CN)

(72) Inventors: Cong Shi, Dongguan (CN); Yixue Lei, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 116 days.

(21) Appl. No.: 16/883,996

(22) Filed: May 26, 2020

(65) Prior Publication Data

US 2020/0288533 A1    Sep. 10, 2020

Related U.S. Application Data

(63) Continuation of application No. PCT/CN2018/117746, filed on Nov. 27, 2018.

(60) Provisional application No. 62/590,865, filed on Nov. 27, 2017.

(51) Int. Cl.
 *H04W 80/02* (2009.01)
 *H04W 76/27* (2018.01)
 *H04W 72/04* (2009.01)

(52) U.S. Cl.
 CPC ......... *H04W 80/02* (2013.01); *H04W 72/042* (2013.01); *H04W 76/27* (2018.02)

(58) Field of Classification Search
 CPC .... H04W 80/02; H04W 76/27; H04W 72/042
 See application file for complete search history.

(56) References Cited

U.S. PATENT DOCUMENTS

| 2016/0081078 | A1 | 3/2016 | Qin |
| 2017/0013611 | A1 | 1/2017 | Dinan |
| 2017/0086172 | A1 | 3/2017 | Dinan |
| 2017/0223696 | A1 | 8/2017 | Qin |
| 2017/0223763 | A1* | 8/2017 | Rahman ............. H04W 74/004 |

(Continued)

FOREIGN PATENT DOCUMENTS

| CN | 103200764 A | 7/2013 |
| CN | 103857054 A | 6/2014 |
| CN | 104185261 A | 12/2014 |

(Continued)

OTHER PUBLICATIONS

First Office Action of the European application No. 18882257.1, dated Jun. 7, 2021.

(Continued)

*Primary Examiner* — Brenda H Pham
(74) *Attorney, Agent, or Firm* — Ladas & Parry, LLP

(57) ABSTRACT

A method and an apparatus of controlling a secondary cell (SCell) are provided. The method of controlling the SCell for new radio carrier aggregation of a user equipment includes receiving at least one of downlink control information (DCI) and a medium access control (MAC) control element (CE) from a network node, wherein the at least one of the DCI and the MAC CE indicates control a SCell, the method includes determining whether to apply or ignore the at least one of the DCI and the MAC CE, and controlling the SCell according to the determination.

12 Claims, 3 Drawing Sheets

(56) References Cited

U.S. PATENT DOCUMENTS

2017/0347326 A1* 11/2017 Dinan ................ H04W 52/146
2017/0353973 A1* 12/2017 Dinan ................ H04W 74/002

FOREIGN PATENT DOCUMENTS

WO    2016117985 A1    7/2016
WO    2019101216 A1    5/2019

OTHER PUBLICATIONS

ETSI MCC, Report of 3GPP TSG RAN2#99bis meeting, Prague, Czech Republic, 3GPP TSG-RAN WG2 meeting #100 R2-1712101, Nov. 27-Dec. 1, 2017.
Alcatel-Lucent et al: "System Design for transition time reduction of SCell Activation for Small Cell ON/OFF" 3GPP Draft: R1-143008 Small Cell L1 SCell Final. 3rd Generation Partnership Project (3GPP), Mobile Compeience Centre: 650, Route Des Lucioles F-06921 Sophia-Antipolis Cedex : France vol. RAN WG1, No. Dresden, Germany; Aug. 18, 2014-Aug. 22, 2014 Aug. 17, 2014 (Aug. 17, 2014), XP050788488, Retrieved from the Internet: URL: http://www.3gpp.org/tp/Meetings_3GPP_SYNC/RAN1/Docs/ [Aug. 17, 2014].
Supplementary European Search Report in the European application No. 18882257.1, dated Nov. 19, 2020.
International Search Report in the international application No. PCT/CN2018/117746, and its English translation provided by WIPO dated Dec. 19, 2019.
Written Opinion of the International Search Authority in the international application No. PCT/CN2018/117746, and its English translation provided by WIPO dated Feb. 27, 2019.
Second Office Action of the European application No. 18882257.1, dated Oct. 7, 2021.

* cited by examiner

METHOD AND APPARATUS OF CONTROLLING SECONDARY CELL

CROSS-REFERENCE TO RELATED APPLICATIONS

This application is a U.S. continuation application of International Application No. PCT/CN 2018/117746, entitled "METHOD AND APPARATUS OF CONTROLLING SECONDARY CELL", filed on Nov. 27, 2018, which claims the benefit of and priority to U.S. provisional application No. 62/590,865 filed on Nov. 27, 2017, the disclosures of which are hereby incorporated by reference in their entireties.

BACKGROUND

In long term evolution (LTE) systems, if a medium access control (MAC) entity is configured with one or more secondary cells (SCells), a network may activate and deactivate one or more configured SCells. Special Cell (SpCell), suitable for primary cell (PCell) and primary SCell (PSCell), is always activated. The network activates and deactivates the SCell(s) by sending an activation/deactivation MAC control element (CE).

In new radio (NR) systems, technical specification group radio access network, working group 2 (TSG-RAN WG2), one of 3rd generation partnership project (3GPP) working groups, agrees to use the MAC CE to activate or deactivate the SCell(s) in a RAN2 #99bis meeting, which is a baseline in long term evolution (LTE) systems.

There is a need to provide a new technical solution of controlling a secondary cell (SCell).

SUMMARY

An object of the present disclosure is to propose a method and an apparatus of controlling a secondary cell (SCell).

In a first aspect of the present disclosure, a user equipment of controlling a secondary cell (SCell) includes a memory, a transceiver, and a processor coupled to the memory and the transceiver. The processor is configured to control the transceiver to receive at least one of downlink control information (DCI) and a medium access control (MAC) control element (CE) from a network node, wherein the at least one of the DCI and the MAC CE indicates control of a SCell, the processor is configured to determine whether to apply or ignore the at least one of the DCI and the MAC CE, and control the SCell according to the determination.

In a second aspect of the present disclosure, a method of controlling a secondary cell (SCell) of a user equipment includes receiving at least one of downlink control information (DCI) and a medium access control (MAC) control element (CE) from a network node, wherein the at least one of the DCI and the MAC CE indicates control of a SCell, the method includes determining whether to apply or ignore the at least one of the DCI and the MAC CE, and controlling the SCell according to the determination.

In a third aspect of the present disclosure, a network node of controlling a secondary cell (SCell) includes a memory, a transceiver, and a processor coupled to the memory and the transceiver. The processor is configured to control the transceiver to transmit, to a user equipment, one of downlink control information (DCI) and a medium access control (MAC) control element (CE), wherein the one of the DCI and the MAC CE to be transmitted indicates control of a SCell, and the processor is configured to control the transceiver not to transmit, to the user equipment, the other one of the DCI and the MAC CE.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments of the present disclosure, a method and an apparatus of controlling a secondary cell (SCell) are provided. RAN1 is discussing whether or not to introduce downlink control information (DCI) to activate and deactivate the SCell. If RAN1 finally agrees to use the DCI to activate or deactivate the configured SCells, there may be signaling ambiguity issue, e.g., what's the behavior when a user equipment receives an activation MAC CE and deactivation DCI simultaneously. There is a need to provide a new technical solution of controlling a secondary cell (SCell) to solve an ambiguity issue when a user equipment receives an activation MAC CE and deactivation DCI simultaneously.

Figure 1:
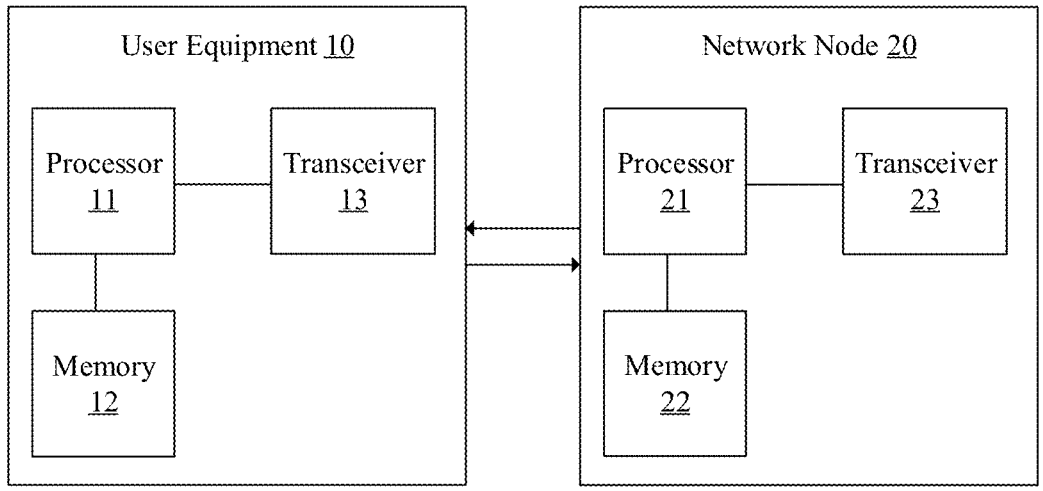
FIG. 1 is a block diagram of a user equipment and a network node of controlling a secondary cell (SCell) according to an embodiment of the present disclosure.

FIG. 1 illustrates that, in some embodiments, a user equipment (UE) 10 and a network node 20 control a cell (SCell) according to an embodiment of the present disclosure. The UE 10 may include a processor 11, a memory 12 and a transceiver 13. The network node 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) new radio (NR) Release 16 and beyond. UEs are communicated with each other directly via a sidelink interface such as a PC5 interface.

In some embodiments, the processor 11 is configured to control the transceiver 13 to receive at least one of downlink control information (DCI) and a medium access control (MAC) control element (CE) from the network node 20. The at least one of the DCI and the MAC CE indicates control of a SCell. The processor 11 is configured to determine whether to apply or ignore the at least one of the DCI and the MAC CE and control the at least one SCell according to the determination.

In some embodiments, the processor 21 is configured to control the transceiver 23 to transmit, to the user equipment 10, one of downlink control information (DCI) and a medium access control (MAC) control element (CE), wherein the one of the DCI and the MAC CE to be transmitted indicates control of a SCell, and control the transceiver 23 not to transmit, to the user equipment 10, the other one of the DCI and the MAC CE. In some embodiments, controlling the transceiver 23 not to transmit, to the user equipment 10, the other one of the DCI and the MAC CE includes: controlling the transceiver 23 not to transmit, to the user equipment 10, the other one of the DCI and the MAC CE between a time point when the one of the DCI and the MAC CE is transmitted and a time point when the one of the DCI and the MAC CE is valid.

Figure 2:
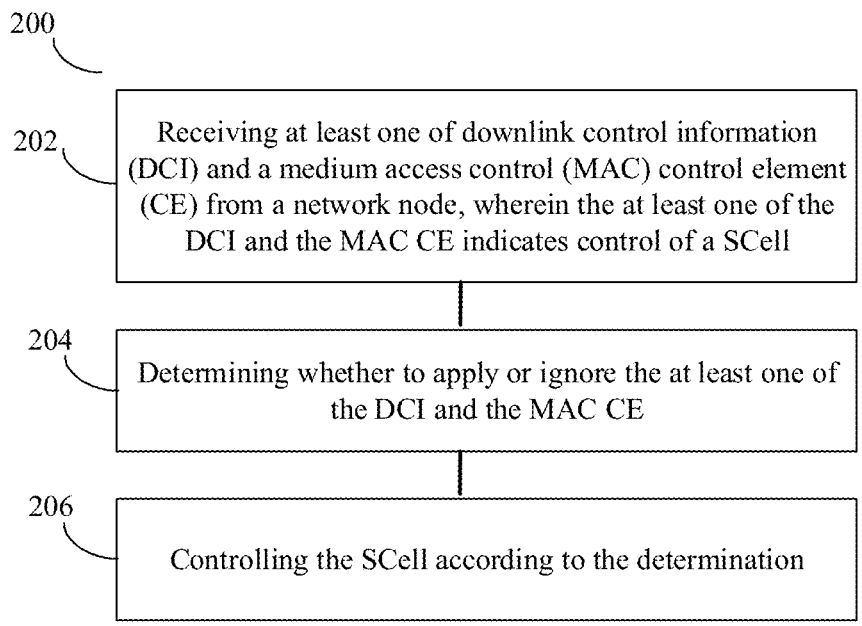
FIG. 2 is a flowchart illustrating a method of controlling a SCell of a user equipment according to an embodiment of the present disclosure.

FIG. 2 illustrates a method 200 of controlling a SCell of the user equipment 10 according to an embodiment of the present disclosure. The method 200 includes: at block 202, receiving at least one of downlink control information (DCI) and a medium access control (MAC) control element (CE) from the network node 20, wherein the at least one of the DCI and the MAC CE indicates control of a SCell, at block 204, determining whether to apply or ignore the at least one of the DCI and the MAC CE, and at block 206, controlling the SCell according to the determination.

Figure 3:
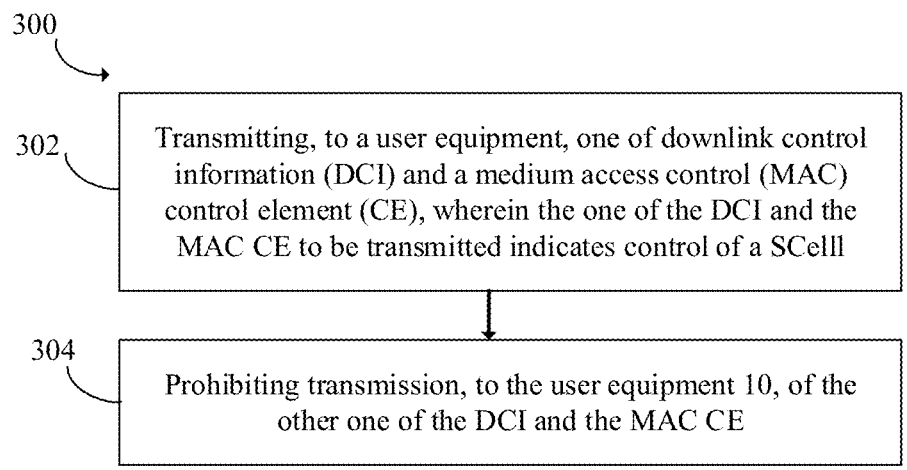
FIG. 3 is a flowchart illustrating a method of controlling a SCell of a network node according to an embodiment of the present disclosure.

FIG. 3 illustrates a method 300 of controlling a SCell of the network node 20 according to an embodiment of the present disclosure. The method 300 includes: at block 302, transmitting, to the user equipment 10, one of downlink control information (DCI) and a medium access control (MAC) control element (CE), wherein the one of the DCI and the MAC CE to be transmitted indicates control of a SCell, and at block 304, prohibiting transmission, to the user equipment 10, of the other one of the DCI and the MAC CE. In some embodiments, prohibiting transmission, to the user equipment 10, of the other one of the DCI and the MAC CE includes: prohibiting transmission, to the user equipment 10, of the other one of the DCI and the MAC CE between a time point when the one of the DCI and the MAC CE is transmitted and a time point when the one of the DCI and the MAC CE is valid.

Figure 4:
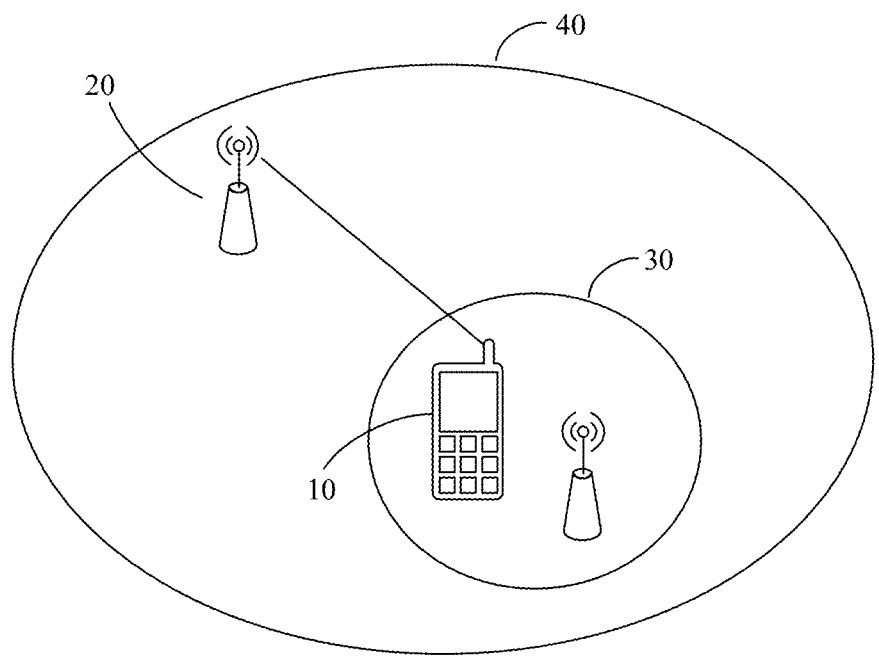
FIG. 4 is a schematic diagram illustrating control of a SCell between a user equipment and a network node according to an embodiment of the present disclosure.

FIG. 4 illustrates that, in some embodiments, control of a SCell 30 between the user equipment 10 and the network node 20 according to an embodiment of the present disclosure is provided. The user equipment 10 may communicate with multiple cells that are managed by the network node 20 and may work on different frequencies. In order to increase a transmission bandwidth, one user may be served by multiple cells, and these cells may be covered by the network node 20. These cells include a primary cell (PCell) 40 and the SCell 30. The PCell 40 can be a serving cell and can be in an active state. The PCell 40 can be handed over through a handover process. The user equipment 10 transmits and receives non-access stratum (NAS) information in the PCell 40, and a physical uplink control channel (PUCCH) is transmitted in the PCell 40.

FIGS. 1 and 4 illustrate that, in some embodiments, when the transceiver 13 receives the DCI and the MAC CE, the processor 11 ignores one of the DCI and the MAC CE. The processor 11 controlling the SCell 30 according to the determination includes: the processor 11 applying the other one of the DCI and the MAC CE to control the SCell 30.

In some embodiments, when the transceiver 13 receives the DCI, the processor 11 controlling the SCell 30 according to the determination includes: the processor 11 applying the DCI to control the SCell 30. When the transceiver 13 sequentially receives the MAC CE and the DCI, and both of the MAC CE and the DCI are determined to be applied, the processor 11 controlling the SCell 30 according to the determination includes: the processor 11 sequentially applying the MAC CE and the DCI to control the SCell 30. When the transceiver 13 sequentially receives the DCI and the MAC CE, and both of the MAC CE and the DCI are determined to be applied, the processor 11 controlling the SCell 30 according to the determination includes: the processor 11 sequentially applying the DCI and the MAC CE to control the SCell 30.

Further, in some embodiments, the transceiver 13 is configured to receive a radio resource control (RRC) message which indicates one of the DCI and the MAC CE will be applied by the processor 11 to control the SCell 30. In details, in some embodiments, the at least one of the DCI and the MAC CE indicating control of the SCell 30 includes: the at least one of the DCI and the MAC CE indicating activation or deactivation of the SCell 30. The processor 11 is configured to activate or deactivate the SCell 30.

FIGS. 1 and 4 also illustrate that, in some embodiments, the processor 21 is configured to control the SCell 30 according to the one of the DCI and the MAC CE to be transmitted. If only one of these two approaches are to be used, there is no ambiguity issue.

Further, in some embodiments, the processor 21 is configured to control the transceiver 23 to transmit a radio resource control (RRC) message which indicates one of the DCI and the MAC CE will be applied to control the SCell. In some embodiments, the processor 21 is configured to perform a configuration with an RRC reconfiguration or an RRC message. The configuration can be per user equipment, per-cell group, or per-cell within a cell group.

In details, in some embodiments, when the transceiver 23 transmits the DCI, the processor 21 applies the DCI to control the SCell 30. When the transceiver 23 transmits the MAC CE, the processor 21 applies the MAC CE to control the SCell 30. When the transceiver 23 sequentially transmits the MAC CE and the DCI, the processor 21 sequentially applies the MAC CE and the DCI to control the SCell 30. When the transceiver 23 sequentially transmits the DCI and the MAC CE, the processor 21 sequentially applies the DCI and the MAC CE to control the SCell 30.

In some embodiments, the control of the at least one SCell 30 includes activation and/or deactivation of the SCell 30. The processor 21 is configured to activate or deactivate the SCell 30.

Figure 5:
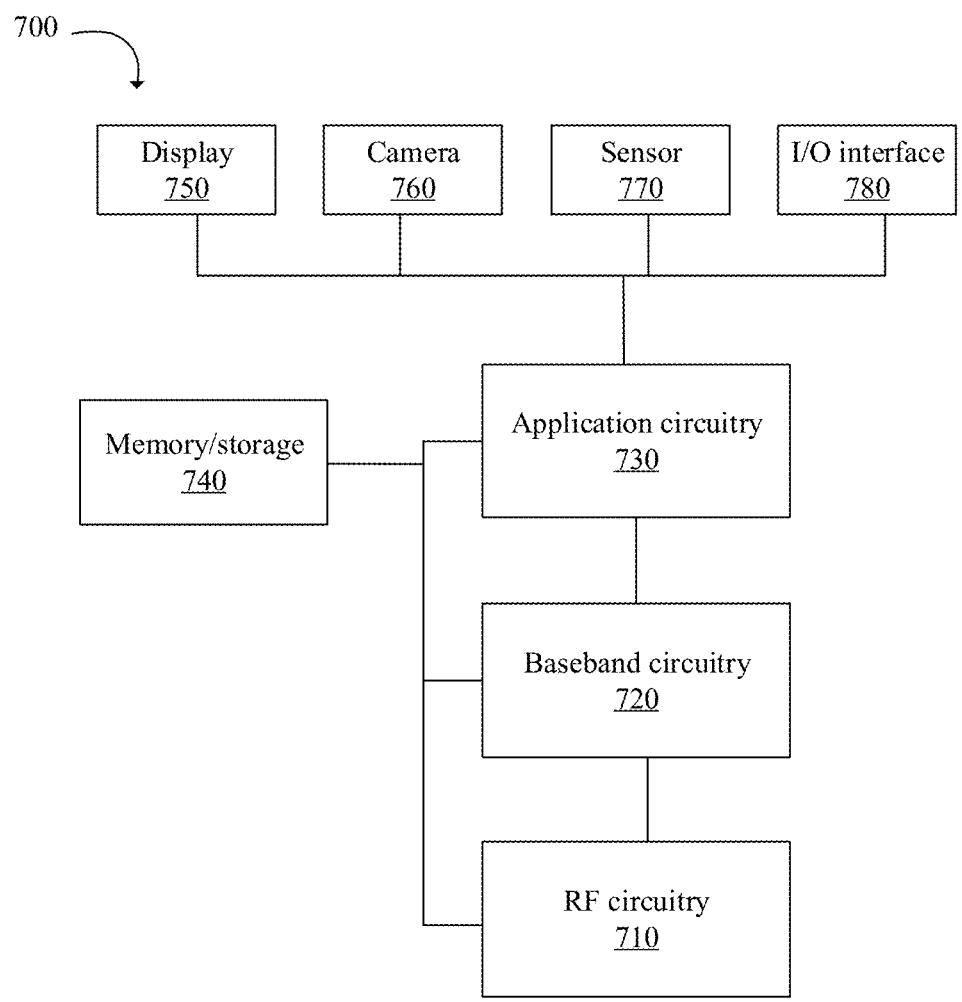
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In some embodiments of the present disclosure, there is provided a non-transitory machine-readable storage medium having stored thereon instructions that, when executed by a computer, cause the computer to perform the above method.

In some embodiments of the present disclosure, there is provided a terminal device, which includes a processor and a memory configured to store a computer program. The processor is configured to execute the computer program stored in the memory to perform the above method.

In some embodiments of the present disclosure, there is provided a network node, which includes a processor and a memory configured to store a computer program. The processor is configured to execute the computer program stored in the memory to perform the above method.

In the embodiment of the present disclosure, a method and an apparatus of controlling a cell (SCell) for new radio carrier aggregation are provided. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A user equipment of controlling a secondary cell (SCell), comprising:
   a memory;
   a transceiver; and
   a processor coupled to the memory and the transceiver, wherein the processor is configured to:
   control the transceiver to receive at least one of downlink control information (DCI) and a medium access control (MAC) control element (CE) from a network node, wherein the at least one of the DCI and the MAC CE indicates control of a SCell;
   determine whether to apply or ignore the at least one of the DCI and the MAC CE; and
   control the SCell according to the determination, wherein in response to that the transceiver receives the DCI and the MAC CE simultaneously, the MAC CE indicating activation of the SCell, and the DCI indicating deactivation of the SCell, the processor is configured to ignore one of the DCI and the MAC CE, and apply the other one of the DCI and the MAC CE to control the SCell.

2. The user equipment of claim 1, wherein when the transceiver receives the DCI, the processor controlling the SCell according to the determination comprises:
   the processor applying the DCI to control the SCell.

3. The user equipment of claim 1, wherein when the transceiver sequentially receives the MAC CE and the DCI, and both of the MAC CE and the DCI are determined to be applied, the processor controlling the SCell according to the determination comprises:
   the processor sequentially applying the MAC CE and the DCI to control the SCell.

4. The user equipment of claim 1, wherein the transceiver is configured to receive a radio resource control (RRC) message which indicates one of the DCI and the MAC CE will be applied by the processor to control the SCell.

5. The user equipment of claim 1, wherein the at least one of the DCI and the MAC CE indicating control of the SCell comprises: the at least one of the DCI and the MAC CE indicating activation or deactivation of the SCell.

6. The user equipment of claim 5, wherein the processor is configured to activate or deactivate the SCell.

7. A method of controlling a secondary cell (SCell) of a user equipment, comprising:
   receiving at least one of downlink control information (DCI) and a medium access control (MAC) control element (CE) from a network node, wherein the at least one of the DCI and the MAC CE indicates control of a SCell;
   determining whether to apply or ignore the at least one of the DCI and the MAC CE; and
   controlling the SCell according to the determination, wherein
   in response to that the DCI and the MAC CE are received simultaneously, the MAC CE indicating activation of the SCell, and the DCI indicating deactivation of the SCell, ignoring one of the DCI and the MAC CE, and applying the other one of the DCI and the MAC CE to control the SCell.

8. The method of claim 7, wherein when receiving the DCI, controlling the SCell according to the determination comprises:
　　applying the DCI to control the SCell.

9. The method of claim 7, wherein when sequentially receiving the MAC CE and the DCI, and both of the MAC CE and the DCI are determined to be applied, controlling the SCell according to the determination comprises:
　　sequentially applying the MAC CE and the DCI to control the SCell.

10. The method of claim 7, wherein the method further comprises:
　　receiving a radio resource control (RRC) message which indicates one of the DCI and the MAC CE will be applied to control the SCell.

11. The method of claim 7, wherein the at least one of the DCI and the MAC CE indicating control of the SCell comprises:
　　the at least one of the DCI and the MAC CE indicating activation or deactivation of the SCell.

12. The method of claim 11, further comprising activating or deactivating the SCell.

* * * * *